Nov. 22, 1932.                L. E. RICHMOND                1,888,737
                            FLUID FLOW INDICATOR
                            Filed Nov. 20, 1931

INVENTOR.
Louis E. Richmond
BY
Fay Oberlin & Fay
ATTORNEYS.

Patented Nov. 22, 1932

1,888,737

UNITED STATES PATENT OFFICE

LOUIS E. RICHMOND, OF SHELBY, OHIO, ASSIGNOR TO THE AUTOCALL COMPANY, OF SHELBY, OHIO, A CORPORATION OF OHIO

FLUID FLOW INDICATOR

Application filed November 20, 1931. Serial No. 576,321.

The present invention relates to a means for indicating the passage of a fluid current through a conduit pipe or tube; or more precisely stated, means for transforming fluid motion through the walls of a conducting passage to mechanical motion on the exterior of such conduit in order to actuate an electric signalling circuit.

The general object and nature of the present invention points to the provision of a novel form of construction of means for indicating fluid flow in a conduit which presents practically no mechanical restriction to the passage of the fluid current, possesses no mechanical connections of transmitting motion through the walls of the conduit, is capable of satisfactorily withstanding pressure surges and hammering action, and requires a minimum amount of attention and repair during operative installation.

Heretofore fluid flow indicators have been constructed of two general types, one involving mechanical lever arms and shafts necessitating the presence of a fluid tight packed bearing in the conduit wall, and the other involving the use of expansible diaphragms and sylphons having the ever present disadvantages of fatigue failure of the flexing metal and a low safety factor of fluid pressure resistance. Briefly outlined, the principle of my invention contemplates the provision of an oscillatable means positioned on the exterior of a fluid conduit and a separate mechanically disconnected member on the interior of the conduit, movable upon the passage of a fluid current; co-relation of movement between the interior and exterior elements to be accomplished through the medium of magnetic attraction. Objects and advantages additional to those above enumerated shall become apparent as the following description proceeds. To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 1:
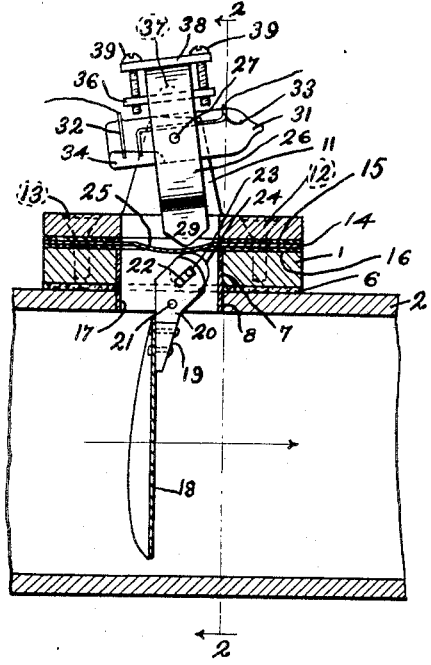
Figure 2:
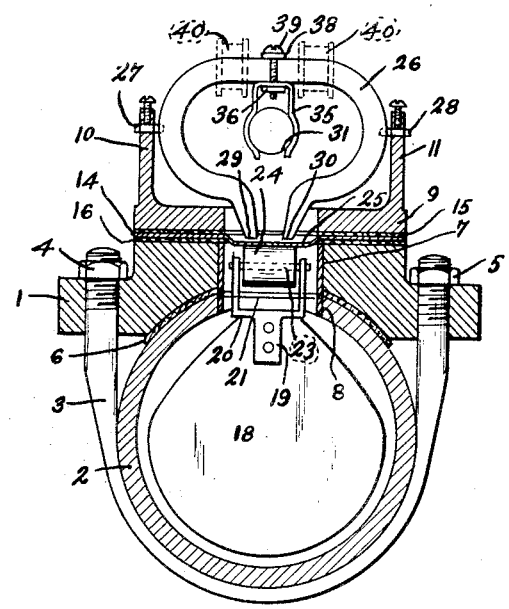
Figure 3:
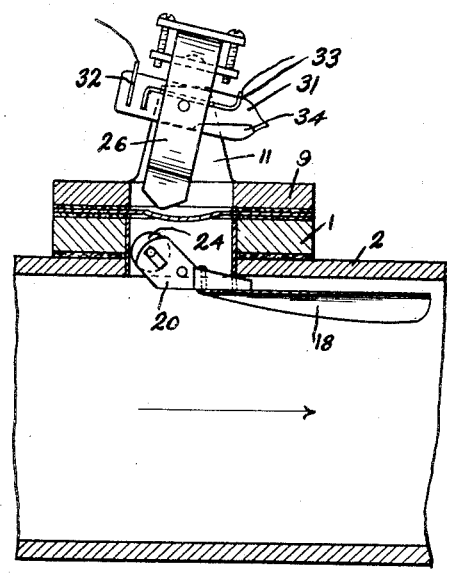

In said annexed drawing:

Fig. 1 is a sectional elevation taken longitudinally of a conduit pipe and showing the device constructed according to the principle of my invention installed in position upon such conduit; Fig. 2 is a transverse sectional view taken substantially upon the line 2—2 of Fig. 1 in the direction of the arrows; Fig. 3 is a longitudinal sectional view similar to Fig. 1 but showing the operating parts in that position which they assume during the passage of a fluid current.

Referring more particularly to the drawing, my device consists of the base member 1 secured in position upon the cylindrical conduit 2 by means of the U-shaped strap bolt 3 and retaining nuts 4 and 5. The bottom portion of the base 1 is arcuately formed to a radius substantially equal to that of the outer periphery of the conduit 2. A sealing gasket 6, which is composed of a suitable resilient material such as rubber or the like, is placed between the arcuate surfaces of the base 1 and conduit 2 in order to provide a permanent fluid tight seal. The base 1 also has a central opening or recess 7 which is adapted to register with an opening 8 of similar dimensions in the conduit 2.

An upper base plate 9 carrying the perpendicular trunnion arms 10 and 11 is secured to the top of the lower base 1 by means of suitable fastening screws 12 and 13. A relatively thin partition 14 composed of non-magnetic metal such as copper or bronze is positioned between the upper base 9 and the lower base 1, and sealed therebetween by means of the gaskets 15 and 16. In order to perfect the fluid tight seal between the interior and exterior of the conduit, a sleeve or interior wall member 17 is positioned around the inner surfaces of the openings 7 and 8.

A paddle 18 which is of pear shaped contour and composed of relatively thin resilient non-ferrous metal is so positioned as to be actuated by the passage of fluid through the conduit 2 in such a direction as indicated by the arrows in Figs. 1 and 3. It is contemplated to make the paddle 18 curved across its lateral surface in order that it may conveniently assume a position shown in Fig. 3 whereby a minimum resistance will be offered to the fluid flow at higher velocity. The paddle 18 is also constructed of a thin resilient metal in order to permit rolling up or bending to a size sufficiently small in order to allow its insertion through the opening 8 in the wall of the conduit 2.

The paddle 18 is suitably attached by means of rivets or the like to the lower lever arm 19 of the bifurcated lever 20 which is pivotally mounted upon the transverse pin 21. The upper bifurcated lever arms have the longitudinal slots 22 in which the pin 23 carries the cylinder 24. The latter is composed of a magnetic metal such as steel, iron, or nickel and is adapted to roll along the under surface of the arcuately depressed portion 25 of the non-magnetic metal partition 14.

A magnet 26 is oscillatably mounted upon the trunnion pins 27 and 28 and has its magnetic poles 29 and 30 directed to a point immediately contiguous to the upper surface of the arcuately bent partition 25.

The oscillatable magnet 26 carries the mercury contact tube 31 which is of glass or similar composition, and in which are positioned the electric terminal wires 32 and 33. A small quantity of mercury 34 is contained within the glass tube 31 and adapted to make and break electrical contact between the terminal wires 32 and 33.

It will thus be seen, by reference to Figs. 1 and 3 that when the paddle 18 is inclined from its position as shown in Fig. 1 to that as shown in Fig. 3 that the cylindrical armature 24, by virtue of its magnetic attraction for the poles of the magnet 26 will produce a corresponding inclination of the latter whereby the mercury 34 will flow out of contact with the terminal wires 32 and 33, breaking electrical connections between such wires. The wires 32 and 33 may be connected in a signal circuit whereby fluid motion in the conduit 2 may be suitably indicated or recorded.

The mercury contact tube 31 is engaged by the resilient clamp 35 which in turn is secured to the metal strip 36. The metal strip 36 has a central projection 37 adapted to register with a corresponding depression in the magnet 26, and is clamped to the latter by means of the upper strip 38 and fastening screws 39. By means of regulating the tension of the fastening screws 39, it will be seen that it is possible to variably adjust the relative angular position of the mercury tube in relation to the magnet 26.

Throughout the foregoing description and appended claims, I have referred to the element 26 as a "magnet". It is hereby intended, however, that the term "magnet" shall be inclusive of any means for producing a magnetic flux whether a permanently magnetized metal or an electro-magnet having the electric exciting coils 40 positioned thereon.

It should be further noted that where a permanent magnet is used, although such a magnet should retain its magnetization for a period of eight to ten years, nevertheless in case of the loss of its magnetic flux, the magnet being attracted normally to a slightly inclined position from the vertical (see Fig. 1), will assume a truly vertical position due to the exertion of gravitational forces only, and the mercury will then be permitted to flow out of contact with the terminals 32 and 33, thereby transmitting the electric signal.

An important advantage of the above described device resides in the fact that pressure surges or excessive "hammering" action in the conduit will merely kick the paddle 18 out of its normal vertical position and will not produce undue strain upon the moving parts of the indicator.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A fluid flow indicator comprising the combination of a fluid conduit, a magnet oscillatably mounted on the exterior of said conduit, and having its poles disposed in proximity thereto, a cylindrical armature for said magnet movably mounted on the interior of said conduit and a non-magnetic partition positioned in the wall of said conduit separating said magnet and said armature, and said armature being magnetically held against and adapted to roll across said partition.

2. A fluid flow indicator comprising the combination of a fluid conduit, a magnet oscillatably mounted on the exterior of said conduit and having its poles disposed in proximity thereto, a cylindrical armature for said magnet movably mounted on the interior of said conduit and a non-magnetic partition positioned in the wall of said conduit separating said magnet and said armature, said armature being magnetically held against and adapted to roll across said partition, and means for moving said armature coincident with fluid motion in said conduit.

3. A fluid flow indicator comprising the combination of a fluid conduit, a magnet oscillatably mounted on the exterior of said conduit and having its poles disposed in proximity thereto, a cylindrical armature for said magnet movably mounted on the interior of said conduit and a non-magnetic partition positioned in the wall of said conduit separating said magnet and said armature, said armature being magnetically held against and adapted to roll across said partition, and electric contact means associated with said magnet for making and breaking an electric circuit upon oscillation of said magnet.

4. A fluid flow indicator comprising the combination of a fluid conduit, a magnet oscillatably mounted on the exterior of said conduit and having its poles disposed in proximity thereto, a cylindrical armature for said magnet movably mounted on the interior of said conduit and a non-magnetic partition positioned in the wall of said conduit separating said magnet and said armature, said armature being magnetically held against and adapted to roll across said partition, means for moving said armature coincident with fluid motion in said conduit, and electric contact means associated with said magnet for making and breaking an electric circuit upon oscillation of said magnet.

5. A fluid flow indicator comprising the combination of a fluid conduit, a magnet oscillatably mounted on the exterior of said conduit and having its poles disposed in proximity thereto, a movable armature for said magnet on the interior of said conduit, a paddle pivotally mounted on the interior of said conduit, a pair of projecting arms attached to said paddle, and longitudinal slots in said arms for reciprocably supporting said armature.

Signed by me this 18 day of November, 1931.

LOUIS E. RICHMOND.